June 17, 1969 R. L. WILLES 3,450,885

IMAGE CONVERTER HAVING PHOTOSENSITIVE MATERIAL HAVING A RESPONSE TIME DEPENDENT ON INTENSITY OF INCIDENT LIGHT

Filed Oct. 25, 1966

INVENTOR

Robert L. Willes

BY

Rennie, Edmonds, Morton Taylor & Adams ATTORNEYS

United States Patent Office 3,450,885
Patented June 17, 1969

3,450,885

IMAGE CONVERTER HAVING PHOTO-SENSITIVE MATERIAL HAVING A RESPONSE TIME DEPENDENT ON INTENSITY OF INCIDENT LIGHT

Robert L. Willes, 160 Chadwick Place, Glen Rock, N.J. 07452

Filed Oct. 25, 1966, Ser. No. 589,405
Int. Cl. H01j 39/12
U.S. Cl. 250—211 8 Claims This invention relates to image conversion method and apparatus and, more particularly, to a method and apparatus for converting a light image to an electrical signal.

The conversion of an optical light image to an electrical signal which may be transmitted to remote locations has found wide application. A well known example of the conversion process is in television communications. However, image conversion also is employed in electronic navigation systems for star tracking and horizon scanning, in electronic military weapons systems for target detection, and for many other uses.

The image conversion method and apparatus of the present invention provides an extremely simple and economical solid state image conversion device of unitary construction which involves no complex electron tube techniques for its fabrication.

The invention makes use of the fact that the photoelectric response time of certain photosensitive materials is strongly dependent upon the intensity of light incident on those materials. For example, the photoelectric response time of a cadmium sulfide photoconductor having a high trap level density is significantly greater when the photoconductor is subjected to a low intensity illumination than when it is exposed to light of substantially higher intensity. Although the exact mechanism of this phenomenon is not understood it is believed that the establishment of a high trap level density in a photosensitive material by suitable doping of impurities in the material serves to heighten the effect.

A solid state image conversion device is provided by the present invention in which a layer of photosensitive material is selected or treated to have a relatively high response time dependency upon the intensity of light illuminating it. When the light image to be converted is projected upon a surface of the layer, a pattern of photoelectric response time values is established in the layer corresponding to the pattern of light intensity values of the projected image. Thus, regions of the layer illuminated by high light intensity portions of the image have shorter photoelectric response times than regions of the layer exposed to lower light intensity areas of the image.

The pattern of photoelectric response times established in the photosensitive layer is scanned by a scanning spot of light which photoelectrically perturbs a small area of the layer to read out the photoelectric response time of the material in the area scanned. The response time of the material in the scanned area is sensed and converted to an electric output signal.

In a preferred embodiment of the invention the photosensitive layer of the conversion device is sandwiched between two electrically conductive strata, at least one of which is transparent to light. The strata are connected through an electrical circuit to a source of electric energy which causes an electric current to flow through the layer. When the image to be converted is projected on to one surface of the layer through a transparent stratum, a corresponding pattern of photoelectric response time values is established in the layer. A constant intensity scanning spot of light, smaller in size than the smallest detail of the input image to be resolved, is then moved over the surface of the layer. The spot may be incident on the surface of the layer opposite the projected image if both strata are transparent or on the same surface as that receiving the projected image if only one stratum is transparent. As the scanning spot moves over the surface of the layer it generates a transient photoconduction current in each region it scans. The response time of the photoconduction current is, as discussed above, dependent on the intensity of the incident light which is comprised of the projected image and the scanning spot. Since the scanning spot is of a constant intensity, the response time of the generated photocurrent is proportional to the intensity of the image regions scanned. As the scanning spot is moved over the layer, the photocurrent is detected in the electric circuit and electrically differentiated with respect to time to produce an electric signal corresponding to the photoelectric response times of the regions scanned and hence the intensity of the corresponding image areas.

It should be particularly noted that the present image conversion method and apparatus does not rely upon the value of photocurrents generated in the scanning operation (see e.g., U.S. Patent 2,944,155 issued to E. F. Mayer) but only on the rate of change of such photocurrents. Because there is no requirement for electric charge carriers to transverse the thickness of the photosensitive layer in the conversion process the layer need not be in the form of a thin film having a thickness on the order of the average carrier range of the material, but may be much thicker. A relatively thick layer of photosensitive material is more easily fabricated and may have a greater photosensitivity than a thin film. This greater sensitivity in turn permits the conversion of fainter images and the use of low level scanning sources such as electroluminescent matrix arrays rather than high intensity cathode ray tube scanning spot sources. Moreover, it is extremely difficult to obtain uniformity of photoconductivity over the surface area of a photosensitive layer, but high uniformity of photoelectric response times is readily obtainable in the layers described for use in the present invention.

The preferred embodiment of the invention, hereinafter described in detail, senses the photoelectric response time variations in the photosensitive material by detecting the rate of change of photoconductivity in the material. However, other photoelectric phenomena such as the photoemission of electrons and the photovoltaic effect may also be detected and differentiated with appropriate electrical means to sense the variation in photoelectric response time in a photosensitive material.

These and further objects and advantages of the present invention will be more readily understood when the following description is read in connection with the accompanying drawing in which.

Figure 1:
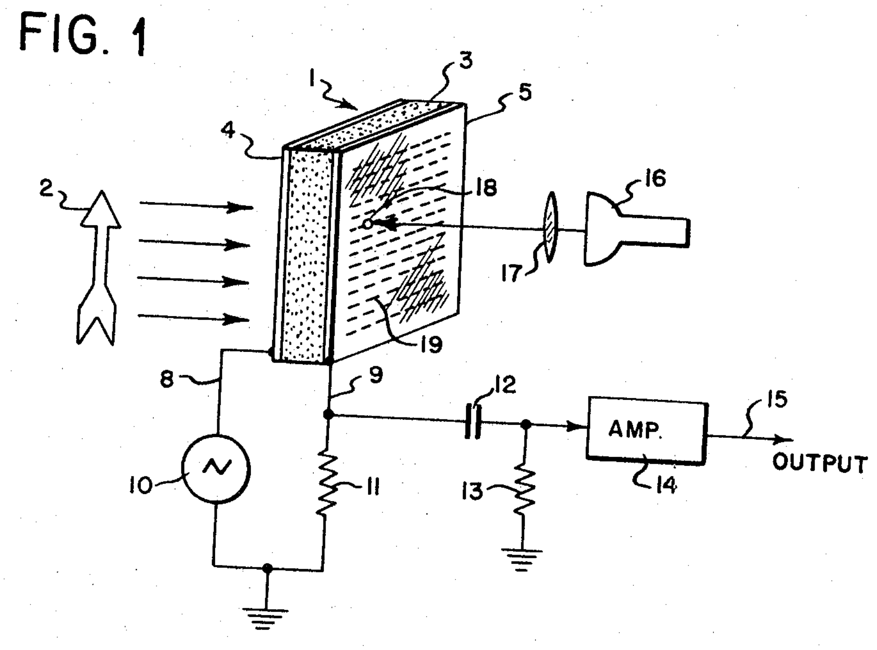
FIG. 1 is a schematic diagram of an image conversion apparatus in accordance with the present invention employing a solid state image conversion device.

The image conversion apparatus shown in FIG. 1 comprises a solid state image converter device 1 which is adapted to receive an input light image 2 upon its surface. The light image 2 may be in any spectral range compatible with the basic spectral response of the device 1 as described hereafter. The image may be projected from a film or slide by conventional optical projection means (not shown in FIG. 1), and in general any known means for impinging an image upon the image conversion device 1 may be used with the apparatus.

The image conversion device comprises a layer 3 of photoconductive material sandwiched between two electrically conductive transparent strata 4, 5. The construction of the device is shown in greater detail in FIG. 2 which, it should be noted, is not drawn to scale and in which the dimensions have been exaggerated to illustrate the device more readily. The first stratum 4 is comprised of a flat glass plate substrate 6 which provides the basic mechanical support for the device, and a tin oxide film 7 coated thereon by well-known techniques. The oxide film 7 is both electrically conductive and transparent to light.

The layer 3 of photoconductive material is deposited on the oxide film 7. Materials suitable for this layer are those which have relatively high variation of photoelectric response time with illumination intensity. A secondary consideration is the level of photosensitivity of the material. Material selection, processing and doping are therefore chosen to optimize these characteristics. The specific aspects of layer construction such as the method of deposition and the optimum thickness of the layer are a function of the individual material chosen. For example, an excellent material for use in this application has been found to be cadmium sulfide doped with an activator, coactivator combination of copper and chlorine. This cadmium sulfide layer is deposited by a spray technique on the oxide film to a thickness between 1 and 2 mils for best response time sensitivity. Other suitable photoconductors may require different deposition techniques, such as chemical or evaporation methods.

Examples of other binary photoconductive materials suitable for use in the device are cadmium selenide with copper and chlorine activation, and activated cadmium telluride. Suitable materials from the ternary class of compounds are mercuric indium sulfide, cadmium indium sulfide and zinc indium sulfide.

Figure 2:
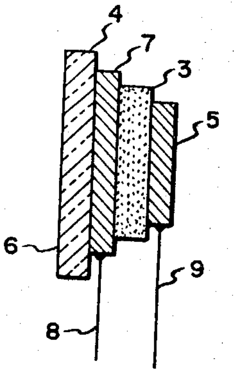
FIG. 2 is a schematic sectional view of the solid state image conversion device shown in FIG. 1.

A metallic film is vacuum evaporated on to the layer 3 to form the second stratum 5. This film is on the order of angstroms in thickness to provide a conductive electrode with a transparency to light of 60–70 percent. The metal selected for such electrode should have a work function compatible with the photoconductive material in order to avoid the formation of a nonohmic contact between the film 5 and the layer 3. An improper contact produces a noisy, relatively insensitive device. Metallic electrode materials therefore depend upon the photoconductor used in the layer; an indium-gold combination has been found to be particularly suitable for the stratum 5 in contact with a cadmium sulfide photoconductor. FIG. 2 also shows two conductive leads 8, 9 connected to the conductive strata 4, 5.

Returning to a consideration of the image conversion apparatus depicted in FIG. 1, the two strata 4, 5 are connected by means of leads 8 and 9 into an electric circuit which comprises a source of electrical energy 10 in series with a first resistor 11. The source 10 shown in FIG. 1 is an A.C. voltage supply but a D.C. voltage source such as a battery would also be suitable. Any voltage appearing across first resistor 11 is supplied to an electrical coupling circuit comprising a capacitor 12 and a second resistor 13. A voltage appearing across the second resistor 13 represents the time derivative of the voltage across the first resistor 11. This voltage across the second resistor 13 is in turn supplied to an amplifier 14 which amplifies the voltage to generate an output electrical signal at the output terminal 15.

FIG. 1 also shows a scanning arrangement wherein a moving spot of light is generated on the surface of a cathode ray tube 16. The spot of light is focused by means of a lens 17 on the surface of the layer 3 through the second stratum 5. Conventional electronic means, not shown in the drawing, are provided to sweep the spot of light over the surface of the cathode ray tube 16 so as to move the scan spot 18 over the surface of the layer 3 in a pattern or scanraster 19 corresponding to the area of the input image to be converted. Although here described in terms of a spot, the scanning light need not be circular in shape but may be in the form of a line or any other predetermined pattern.

In operation, the light image 2 to be converted to the output signal is projected upon the surface of the photoconductive layer 3 through the stratum 4. This illumination of the layer by the image 2 establishes a corresponding pattern of photoelectric response time values in the layer 3. When the electric source 10 is energized, an initial electric current flows through the layer 3 and through the first resistor 11. The scanning arrangement of the system is actuated to cause the scanning spot of light 18 to move over the surface of the layer 3 in a predetermined scan pattern 19. As the spot moves over the layer 3 it causes the generation of a scan photocurrent component in the region where it is incident. This scan photocurrent component appears across the first resistor 11 as a change in voltage. The rate of change of this voltage is dependent upon the photoelectric response times of the material in the layer 3 being scanned. As already described these photoelectric response times are in turn dependent upon the intensity of corresponding areas of the input light image 2. The changing voltage across the first resistor 11 is differentiated with respect to time by the circuit 12, 13 and amplified to give the output electrical signal corresponding to the intensity of the image regions scanned.

The output signal may be transmitted to a location remote from the conversion apparatus and supplied to a display device synchronized to the conversion scanning arrangement to reproduce the input image. Or, the output signal may be fed to other electronic circuitry and processed to provide target detection or pattern recognition information with no optical reconstruction of the input image.

The scanning arrangement shown with the conversion apparatus of FIG. 1 uses a cathode ray tube to generate a flying spot scan but any known means of impinging a scanning spot of light upon a surface of the conversion device may be employed. Furthermore, because the invention permits the use of relatively thick and highly photosensitive layers, input image and scanning spot sources may be of very low light intensity; thus, a relatively faint electroluminescent matrix array could be substituted for the scanning light source shown.

Cadmium sulfide photoconductor devices of the type described respond to light in the range from about 5000 to 7000 angstroms and have demonstrated sensitivity to input image levels of $10^{-14}$ watts at the photoconductor surface. The scanning spot intensity for such devices need be only approximately 10 foot-lamberts at the photoconductor surface for adequate response time sensing.

Since the photoconductor response time at any incremental point is determined by the initial slope of the scan photocurrent component, only a very short scan spot dwell time is required. This dwell time may be considerably shorter than the basic photoconductor response time constant itself; for example, with a cadmium sulfide photoconductive layer having a photoelectric response time constant of 20 milliseconds, the scan spot dwell time need be only 100 microseconds. It should be noted that in devices requiring the discharge of a dielectric layer by a scanning beam the scan rate must be relatively slow, limited by the time required for the dielectric layer to switch and to recharge to its initial state. This time is generally in the order of 50 to 100 milliseconds for high resistivity materials. Because the solid state image conversion of this invention does not involve the discharging of a dielectric layer, but rather the sampling of photoelectric response time values, the scan spot dwell time can be very short and the scanning rate very fast.

Figure 3:
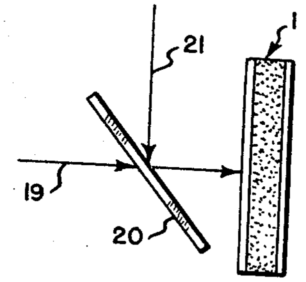
FIG. 3 is a schematic diagram of a modification of the scanning arrangement of the conversion apparatus of FIG. 1.

FIG. 1 shows the input image 2 and the scanning spot 18 projected onto opposite faces of the layer 3, but both image and scan spot may impinge upon the same surface of the device. FIG. 3 shows such an arrangement in which light from an input image 19 passes through a beam splitting mirror 20 onto the photoconductor surface of the conversion device 1. Light from a scan spot source 21 is directed at mirror 20 and reflected from it onto the same surface of the device 1. Only one of the conductive strata of the device need be transparent in such an arrangement. Otherwise the operation of the image conversion apparatus is identical to that already described in connection with FIG. 1.

It will be understood that although specific input imaging, scanning, and electric circuit means have been described, the present invention is not limited to those particular arrangements. Rather, the invention is meant to embrace generally a method and apparatus wherein an input image is impinged upon a surface of a layer of photosensitive material, the photoelectric response time of said material being dependent upon the intensity of light incident thereon, and wherein when a scanning spot of light impinges upon a surface of the layer, the variation in photoelectric response time of the layer is detected and an electric signal corresponding to that variation is generated.

Moreover, various changes in the details, materials, steps and arrangement of parts which have been herein described and illustrated in order to explain the nature of the invention may be made by those skilled in the art within the principle and scope of the invention as expressed in the appended claims.

What is claimed is:

1. A method for converting a light image to an electric signal comprising the steps of:

(a) Impinging a light image upon a surface of a layer of photosensitive material, the photoelectric response time of said material being dependent upon the intensity of light incident thereon;

(b) impinging a scanning spot of light upon a surface of said layer; and (c) sensing the variation of the photoelectric response time of the material.

2. The method according to claim 1 wherein the light image and the scanning spot of light impinge upon the same surface of the layer of photosensitive material.

3. The method according to claim 1 wherein the step of sensing the variation of the photoelectric response time of the material comprises the steps of detecting photoconduction current in the layer and differentiating said current with respect to time.

4. Apparatus for converting a light image to an electric signal comprising:

(a) a layer of photosensitive material adapted to receive a light image and a scanning spot of light upon at least one surface thereof, the photoelectric response time of said material being dependent upon the intensity of the light incident thereon; and (b) electric circuit means for sensing the variation in the photoelectric response time of said material.

5. Apparatus according to claim 4 wherein the layer of photosensitive material is adapted to receive the light image and the scanning spot of light upon opposite surfaces thereof.

6. Apparatus according to claim 4 wherein said circuit means comprises means for detecting photoconduction current in the layer and means for differentiating said current with respect to time.

7. Apparatus according to claim 4 wherein said circuit means comprises:

(a) two electrically conducting strata, each stratum being in contact with an opposite surface of said layer and at least one of said strata being transparent to light.

(b) means for connecting said strata to a source of electric energy whereby an electric current is caused to flow through said layer, (c) means for generating a first electric signal corresponding to said current; and (d) means for differentiating said first electric signal with respect to time and generating an output electric signal corresponding to the rate of variation of said current with respect to time.

8. Apparatus according to claim 7 wherein both strata are transparent to light.

References Cited

UNITED STATES PATENTS

| | | | |
|---|---|---|---|
| 2,912,592 | 11/1959 | Mayer | 250—211 |
| 3,335,226 | 8/1967 | Wilcox | 178—7.2 |

WALTER STOLWEIN, *Primary Examiner.*

M. ABRAMSON, *Assistant Examiner.*

U.S. Cl. X.R.

178—7.2